United States Patent [19]

Turner et al.

[11] 4,236,572
[45] Dec. 2, 1980

[54] FLUID COOLED HEAT EXCHANGER SYSTEM

[75] Inventors: Horace G. Turner, Chandler's Ford; Peter J. Taylor, Fareham, both of England

[73] Assignee: Plessey Handel und Investments AG, Zug, Switzerland

[21] Appl. No.: 936,786

[22] Filed: Aug. 25, 1978

[30] Foreign Application Priority Data

Sep. 6, 1977 [GB] United Kingdom ............... 37065/77

[51] Int. Cl.³ ............................................ G05D 15/00
[52] U.S. Cl. ..................................... 165/38; 137/110; 251/126
[58] Field of Search ....................... 165/35, 38; 123/41, 123/33, 196 AB; 251/126; 137/110, 114, 605

[56] References Cited

U.S. PATENT DOCUMENTS 2,809,810  10/1957  Carroll et al. ................. 123/196 AB
3,147,823  9/1964  Killackey et al. ............ 123/196 AB Primary Examiner—Albert W. Davis
Assistant Examiner—Margaret A. Focarino
Attorney, Agent, or Firm—Fleit & Jacobson

[57] ABSTRACT

A fluid cooled heat exchanger system comprising a heat exchanger, first conduit means connected to the heat exchanger, a pump for pumping a cooling fluid to the heat exchanger via the first conduit means, second conduit means for receiving fluid from the pump that is in excess of the heat exchanger requirements, and a valve which is so connected to the first and second conduit means that fluid that has passed through the heat exchanger via the first conduit means mixes in the valve with fluid that has by-passed the heat exchanger via the second conduit means, and the valve having a movable valve element which is moved off a valve seat by an amount dependent upon the flow of fluid in the second conduit means whereby the flow of fluid through the heat exchanger is maintained substantially constant.

5 Claims, 7 Drawing Figures

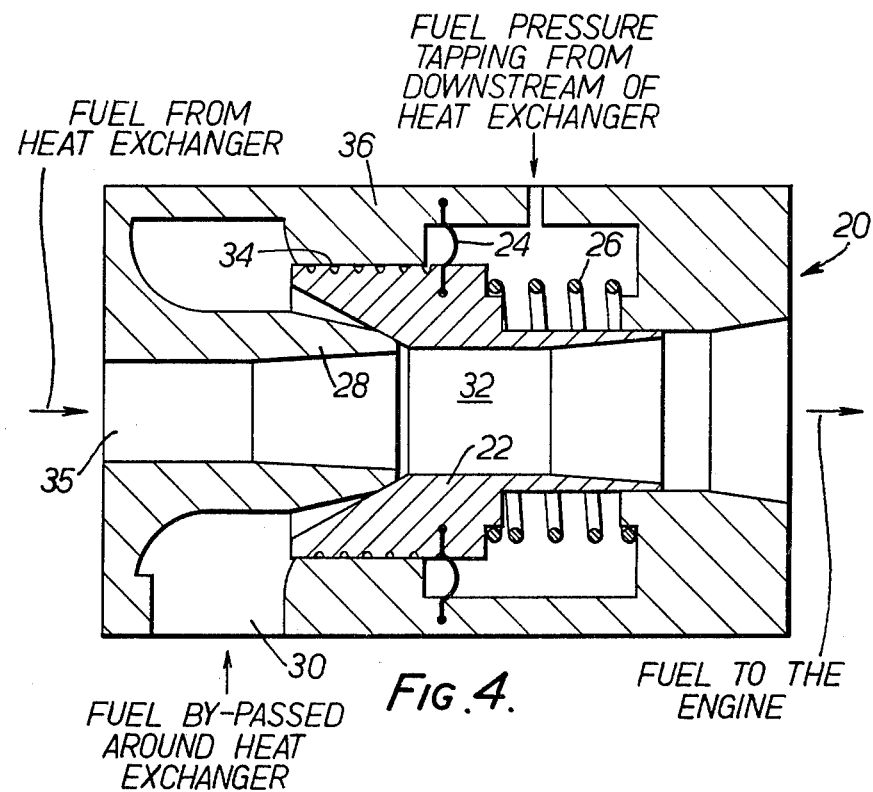
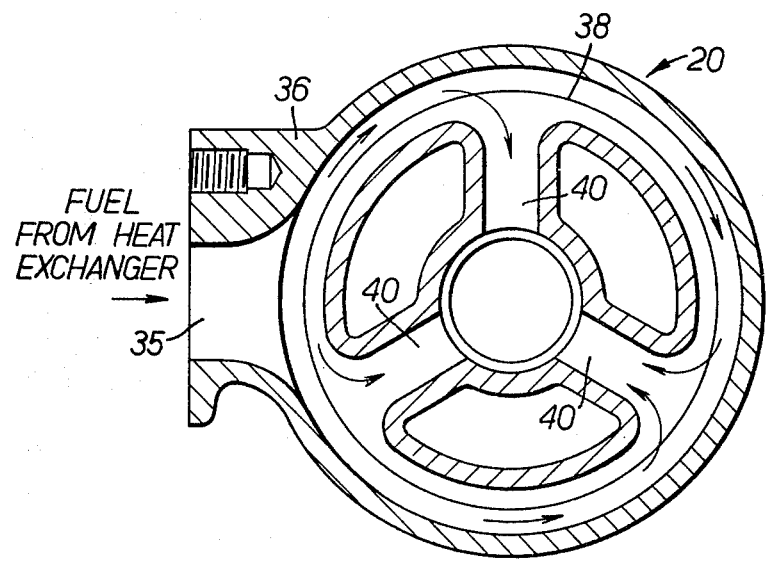

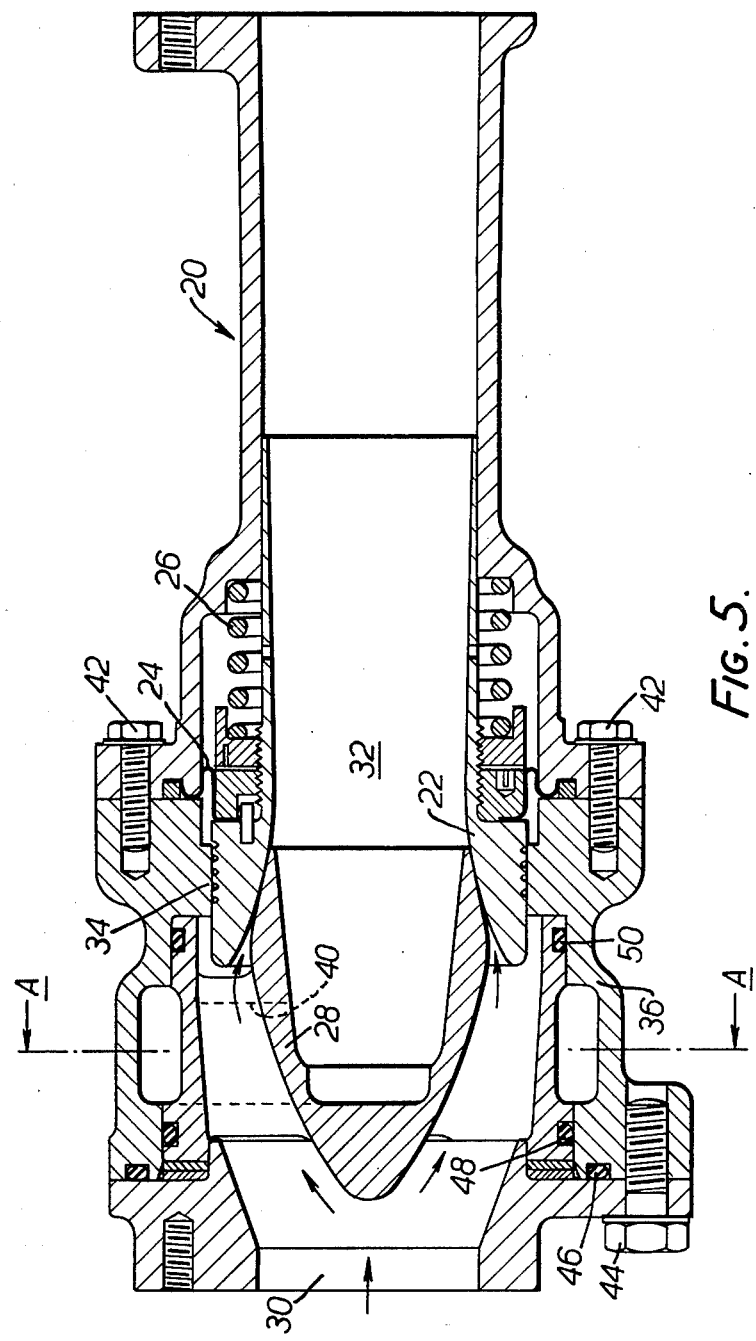

FLUID COOLED HEAT EXCHANGER SYSTEM

This invention relates to a fluid cooled heat exchanger system.

Fuel provides a convenient means of cooling various services on aircraft and aero engines. These services, for example hydraulic oil, cabin air, electronic equipment and engine oil, are generally cooled by the passage of fuel through a heat exchanger. Due to the widely varying rates of fuel flow consumed by the engine, particularly if it is equipped with a reheat augmentor, a substantial pressure drop would occur across the fuel cooled heat exchanger at the maximum fuel flow. It is conventional practice therefore to size the heat exchanger to accept approximately the minimum fuel flow consumed by the engine and by-pass the excess fuel flow around the heat exchanger through a pressure relief valve.

Due to the widely varying rates of fuel flow, the rate of fuel flow by-passed through the pressure relief valve can be substantially larger than the fuel flow through the heat exchanger. Considerable power is therefore unnecessarily expended in pumping a high rate of fuel flow against the impedance provided by the pressure relief valve. This power is not recovered, as the energy in the by-pass flow is totally destroyed by the throttling action of the pressure relief valve.

A similar power loss can occur in other fluid cooled heat exchanger systems such for example as where the fluid is a liquid in a chemical plant or where the fluid is a gas such as hydrogen or carbon dioxide in a power station.

It is an aim of the present invention to provide a fluid cooled heat exchanger system in which energy conservation, with all its attendant benefits, can be achieved.

Accordingly, this invention provides a fluid cooled heat exchanger system comprising a heat exchanger, first conduit means connected to the heat exchanger, a pump for pumping a cooling fluid to the heat exchanger via the first conduit means, second conduit means for receiving fluid from the pump that is in excess of the heat exchanger requirements, and a valve which is so connected to the first and second conduit means that fluid that has passed through the heat exchanger via the first conduit means mixes in the valve with fluid that has by-passed the heat exchanger via the second conduit means, and the valve having a movable valve element which is moved off a valve seat by an amount dependent upon the flow of fluid in the second conduit means whereby the flow of fluid through the heat exchanger is maintained substantially constant.

By providing a substantially constant fluid flow through the heat exchanger, a substantial pressure drop across the heat exchanger at maximum fluid flow from the pump can be avoided. The fluid that by-passes the heat exchanger and enters the valve is effective to pull or suck the fluid through the heat exchanger. The energy in the fluid that by-passes the heat exchanger and which would normally be totally destroyed by throttling in the hitherto used pressure relief valve, is partially recovered by the mixing of two fluid streams and the subsequent diffusion which occurs in the valve employed in the system of the present invention.

Preferably, the pump is a centrifugal pump. Other types of pump, for example a positive-displacement pump, can however be employed.

The movable valve element may be a spool which seats over a tubular inlet receiving the fluid from the heat exchanger. Usually, the movable valve element will be spring biased to its closed position.

Advantageously the movable valve element is provided with a damping device. The damping device may be constituted by a spiral groove in the outer surface of the spool.

Embodiments of the invention will now be described solely by way of example and with reference to the accompanying drawings in which:

FIG. 4 is a longitudinal section through a first valve for including in a fluid cooled heat exchanger system of the invention;

FIG. 5 is a longitudinal section through a second valve for including in a fluid cooled heat exchanger system of the invention;

FIG. 6 is a cross-section on the line A—A shown in FIG. 5; and

Figure 1:
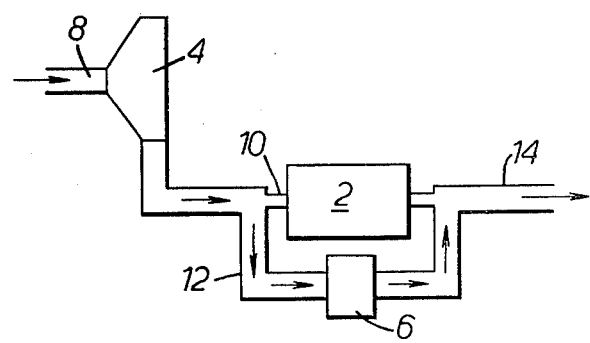
FIG. 1 shows a known fluid cooled heat exchanger system.

Referring to FIG. 1, there is shown a known fluid cooled heat exchanger system comprising a heat exchanger 2, a pump 4 and a pressure relief valve 6. The system is for use in an aircraft and fuel passes along a conduit 8 to the pump 4. The pump 4 pumps the fluid to the heat exchanger along a conduit 10 and to the pressure relief valve 6 along a by-pass conduit 12. The fluid flows from the heat exchanger 2 and the pressure relief valve 6 are combined in the conduit 14 which leads to the aircraft engine. Due to the widely varying rates of fuel flow demanded by the aircraft engine, the rate of fuel flow by-passed along the conduit 12 can be substantially larger than the fuel flow passing along the conduit 10 to the heat exchanger 2. Considerable power is therefore unnecessarily expended in pumping a high rate of fuel flow against the impedance provided by the pressure relief valve 6. This power is not recovered, as the energy in the by-pass conduit 12 is totally destroyed by the throttling action of the pressure relief valve 6.

Figure 2:
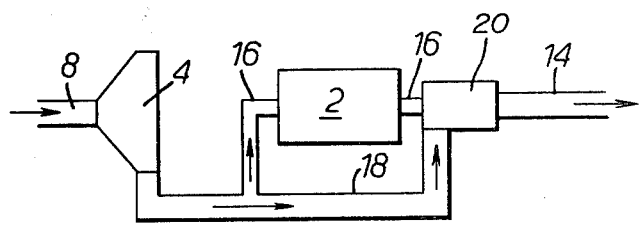
FIG. 2 shows a first fluid cooled heat exchanger system in accordance with the invention.

In FIG. 2, similar parts as in FIG. 1 have been given the same reference numerals and their construction and operation will not again be given. In FIG. 2, the pump 4 pumps fuel to the heat exchanger 2 via a first conduit 16, and a second conduit 18 is provided for accepting fuel from the pump 4 that is in excess of the heat exchanger requirements. A spill control and recovery valve 20 is so positioned that it receives fuel from the heat exchanger 2 and the conduit 18. The fuel from the valve 20 is then passed along the conduit 14 to the engine.

It will be seen that the valve 20 controls the differential pressure across the heat exchanger to a substantially constant value by-passing the surplus fuel flow through itself. The energy contained in this by-pass flow, which would normally be totally destroyed by throttling, is partially recovered. The energy recovery is achieved by mixing the two fuel streams and subsequent diffusion in the valve 20.

Figure 3:
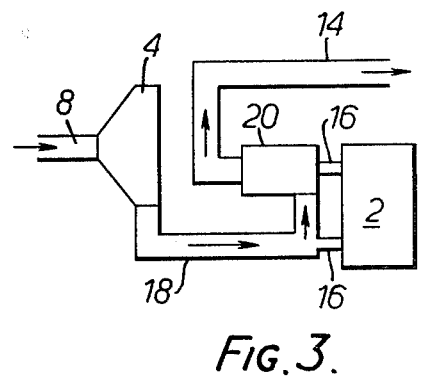
FIG. 3 shows a second fluid cooled heat exchanger system in accordance with the invention.

In FIG. 3, similar parts as in FIG. 2 have been given the same reference numerals and their construction and operation will not again be given. In FIG. 3, the valve 20 has merely been repositioned as shown and the energy savings are as in FIG. 2.

FIG. 4 shows in detail a typical spill control and recovery valve 20. The valve 20 comprises a simple spring loaded sliding profiled valve element 22 to which a flexible diaphragm 24 is attached. The force of a spring 26 on this valve element 22 biasses it on to a profiled static nozzle 28 which centrally communicates with the fuel flow passing through the fuel cooled heat exchange 2.

The differential pressure across the heat exchanger 2 is sensed across the diaphragm 24 and overcomes the spring preload at a predetermined value. When this differential pressure exceeds a predetermined value, the sliding valve element 22 moves off the static nozzle 28 and causes fuel to by-pass the heat exchanger 2 and mix with the fuel flow through the nozzle (and heat exchanger). The by-passed fuel enters the valve 20 through the port 30.

The higher pressure of the by-passed flow is converted into velocity (kinetic energy) and the mixing occurs in a cylindrical mixing area 32 of the sliding valve element 22 so that a substantially constant flow velocity is attained. The mixed flow is then diffused in the valve 20 and the kinetic energy is partially converted into pressure in accordance with Bernoullis Law. The fuel is then delivered to the engine fuel system along conduit 14 and ultimately burned in the engine combustion system.

The disturbing forces on the sliding valve are generally unpredictable when the sliding valve element 22 is just open. To minimise any potential perturbations in this condition, the valve element 22 is automatically damped by the incorporation of a single start spiral groove 34 around its perimeter. This permits the pressure upstream of the heat exchanger 2 to communicate with the left hand chamber of the flexible diaphragm 24. The impedance provided by this arrangement is maximised when the maximum length of the groove 34 is covered by the body 36 of the valve 20. As the valve element 22 slides towards the right, the effective area of the groove 34 is reduced to reduce its impedance. The damping characteristics of the valve 20 are thereby progressively reduced as the valve element 22 opens to provide stability in all conditions.

In FIGS. 5 and 6, similar parts as in FIG. 4 have been given the same reference numerals and their construction and operation will not again be given. In FIGS. 5 and 6, the by-passed fuel enters the valve 20 axially whereas in FIG. 3 it enters the valve 20 radially. The axial entry is preferred since the by-passed fluid which can be substantial is not then forced to turn through a right angle in the valve 20, which can be energy consuming. In FIG. 5, the fuel from the heat exchanger enters via the inlet port 35 and moves around an annular chamber to inlet passages 40. The inlet passages 40 lead the fuel to the centre of the profiled static nozzle 28.

As shown in FIGS. 5 and 6, the valve body 36 is manufactured in various parts which are held together by bolts 42 and 44. O-ring seals 46, 48 and 50 are positioned as shown to stop fuel leakages from the valve 20.

Figure 7:
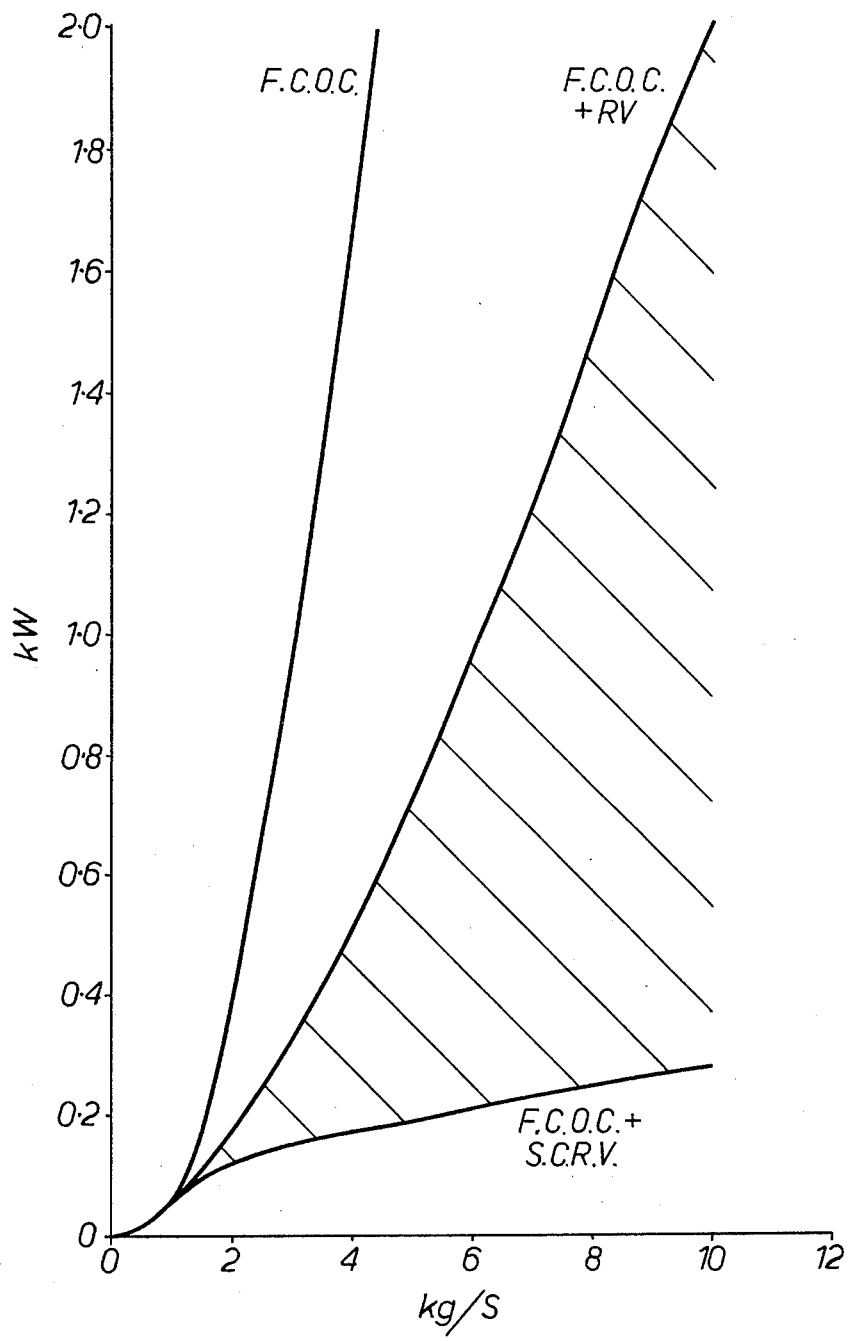
FIG. 7 is a graph showing the power savings made by a system in accordance with the invention compared with two known fluid cooled heat exchanger systems.

Referring now to FIG. 7, there is shown the power loss in kilowatts against the first stage pump flow in kilograms per second of a fuel cooled oil cooler (F.C.O.C.), a known combination of a fuel cooled oil cooler having a pressure relief valve (F.C.O.C. +relief valve), and a fuel cooled oil cooler with a spill control and recovery valve (F.C.O.C. with S.C.R.V.). The power saving achieved by the F.C.O.C. with S.C.R.V. is shown in the shaded portion.

It is to be appreciated that the embodiments of the invention described above have been given by way of example only and that modifications may be effected. Thus, for example, a pump other than a centrifugal pump can be used to pump a gas or a liquid other than fuel to the heat exchanger.

What we claim is:

1. A fluid cooled heat exchanger system comprising a heat exchanger, first conduit means connected to the heat exchanger, a pump for pumping a cooling fluid to the heat exchanger via the first conduit means, second conduit means for receiving fluid from the pump that is in excess of the heat exchanger requirements, and a valve which is so connected to the first and second conduit means that fluid that has passed through the heat exchanger via the first conduit means mixes in the valve with fluid that has by-passed the heat exchanger via the second conduit means, and the valve having a movable valve element which is moved off a valve seat by an amount dependent upon the flow of fluid in the second conduit means whereby the flow of fluid through the heat exchanger is maintained substantially constant, and in which the movable valve element is a spool with seats over a tubular inlet receiving the fluid from the heat exchanger.

2. A heat exchanger system according to claim 1 in which the movable valve element is spring biased to its closed position.

3. A heat exchanger system according to claim 1 in which the movable valve element is provided with a damping device.

4. A heat exchanger system according to claim 1 in which the damping device is constituted by a spiral groove in the outer surface of the spool.

5. A heat exchanger system according to claim 1 in which the pump is a centrifugal pump.

* * * * *